United States Patent [19]

Darash

[11] 4,107,048
[45] Aug. 15, 1978

[54] TURBULENCE AMPLIFIER BAFFLE

[75] Inventor: Raymond N. Darash, Euclid, Ohio

[73] Assignee: The Weatherhead Company, Cleveland, Ohio

[21] Appl. No.: 765,757

[22] Filed: Feb. 4, 1977

[51] Int. Cl.² ............................................ B01D 29/10
[52] U.S. Cl. .................................... 210/407; 55/269; 210/443; 210/453
[58] Field of Search .............. 210/407, 418, 420, 429, 210/430, 431, 437, 440–446, 451, 453, 456, 184; 55/455–457, 269

[56] References Cited

U.S. PATENT DOCUMENTS

| 2,526,656 | 10/1950 | Goetz | 210/456 X |
| 2,595,455 | 5/1952 | Bottum | 210/456 X |
| 3,355,021 | 11/1967 | Jones | 210/456 X |
| 3,545,179 | 12/1970 | Nelson et al. | 55/455 X |
| 3,754,658 | 8/1973 | Messing | 210/443 X |

Primary Examiner—William A. Cuchlinski, Jr.
Attorney, Agent, or Firm—McNenny, Pearne, Gordon, Gail, Dickinson & Schiller

[57] ABSTRACT

An assembly, particularly useful in a fluid filter system, in which fluid is caused to flow in a helical pattern in a circular canister to increase turbulence of the fluid and thereby benefit both the filtering process and heat transfer with the canister body. Flow directing means is disclosed for gradually accelerating and deflecting fluid into the helical flow pattern in an efficient manner without internally heating the fluid, thereby allowing the assembly to serve as a fluid cooler.

7 Claims, 5 Drawing Figures

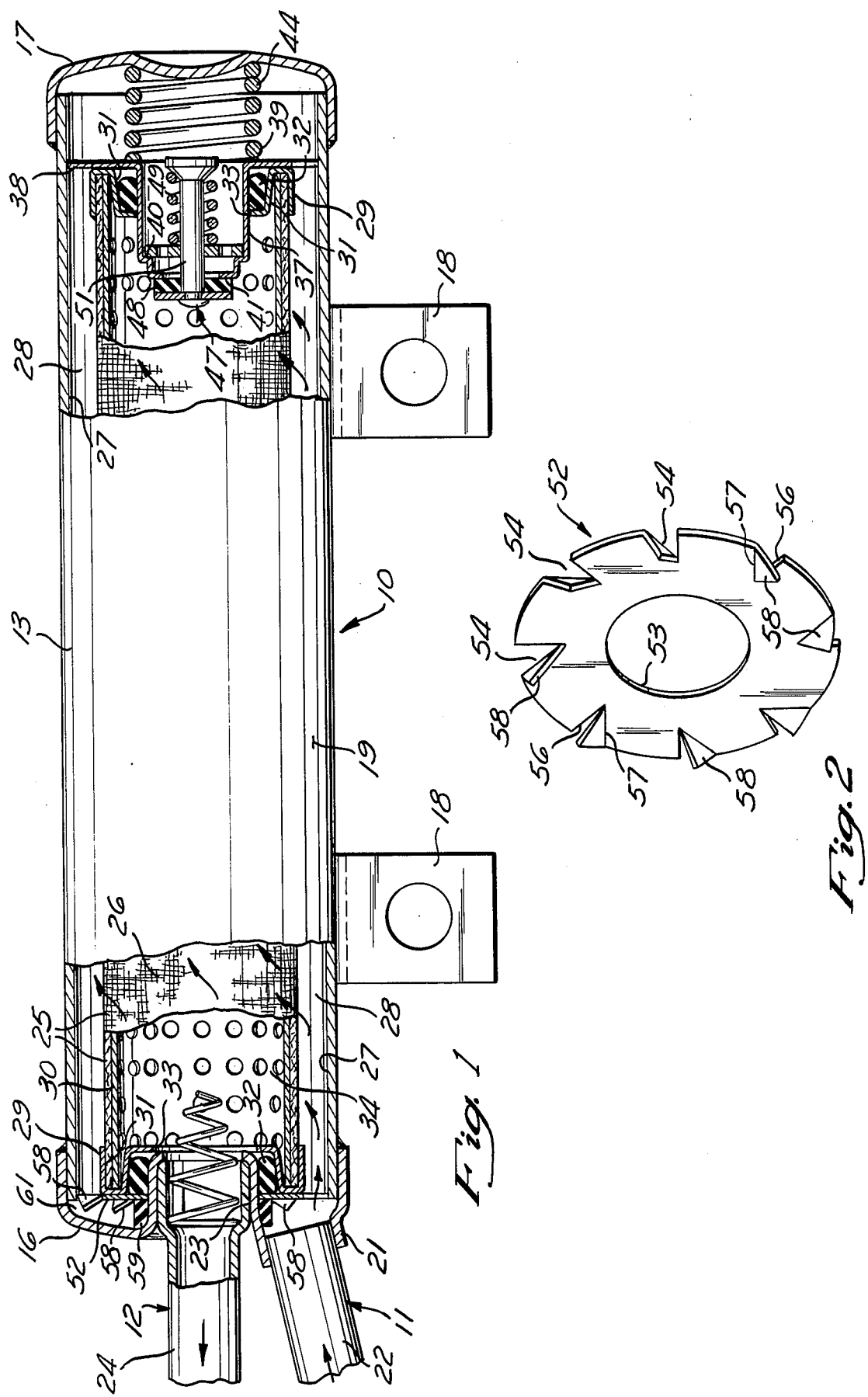

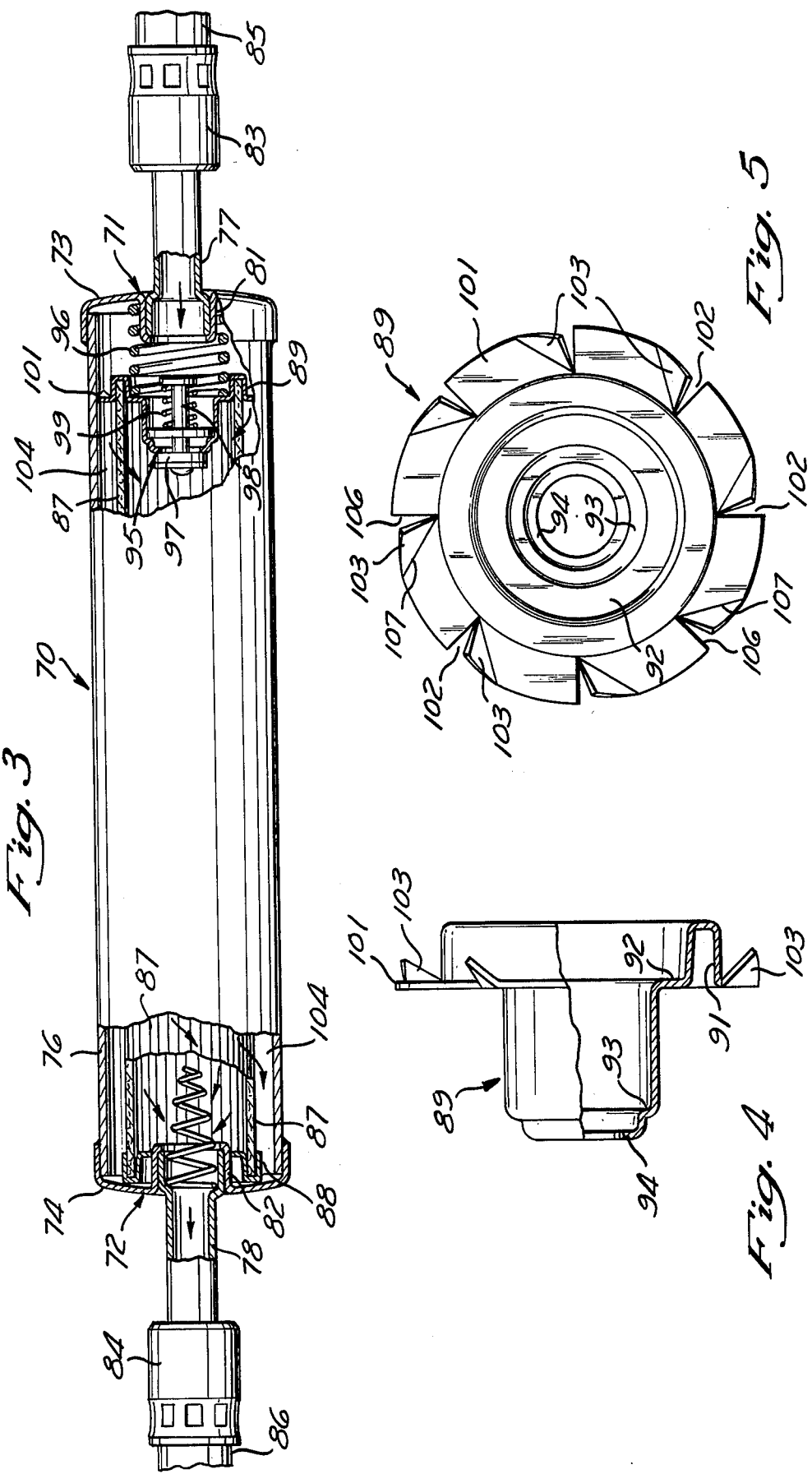

TURBULENCE AMPLIFIER BAFFLE

BACKGROUND OF THE INVENTION

The invention relates to fluid treating means and, in particular, to devices for increasing the turbulence of fluid flow in a closed zone.

DESCRIPTION OF THE PRIOR ART

Filter cartridges for fluids such as lubricating oils and hydraulic fluids are widely known. Such cartridges typically include a cylindrical canister or housing in which a filter element is concentrically disposed. Fluid is circulated through the housing and filter to remove foreign particles suspended in the incoming oil. It is known from U.S. Pat. Nos. 3,272,336; 3,622,004; 3,637,078; and 3,722,691, for example, to provide in a cylindrical housing means for directing incoming oil into a circumferential or helical path which is at least partially tangential to the outer surface of a cylindrical filter element concentrically arranged within the housing. Helical or circumferential flow over a cylindrical filter is considered beneficial for various reasons, including more uniform distribution of flow over the full filtering surface, centrifugal separation of heavy particles prior to actual passage of the fluid through the filter and continuous scrubbing of the filter surface by fluids flowing over the filter.

Fluid power circuits such as found in automotive power steering systems normally generate heat during their operation and under extreme service or environmental conditions, such heat may cause excessive temperatures to be reached within the system. High oil or fluid temperature in a system such as a power steering system may lead to degradation and premature failure of elastomeric seals and hoses. It is especially important in fluid circuits operating in high temperature environments without a high reserve heat capacity, and/or without a cooler or heat exchanger for removing excess heat, that sources of flow-induced pressure drop through orifices and the like be avoided to reduce unnecessary heat build-up.

SUMMARY OF THE INVENTION

The invention provides flow-directing means adapted to be employed in cartridge-type fluid filters or other circular housings for developing a helical flow pattern around the housing interior. In addition to affording previously recognized benefits of improved flow distribution over a filter, centrifugal separation of foreign material, and fluid scrubbing of the filter, the flow-directing means is of such efficiency in operation that substantially no heat is generated within the fluid while it is influenced thereby. As a result, the flow-directing means is particularly useful in combination with a housing for operation as an efficient fluid cooler. By developing a swirling flow within a housing, heat transfer with the interior of the housing walls is greatly increased to ultimately allow greater amounts of heat to be discharged from the housing by radiation and/or convection.

As disclosed, the flow-directing means is arranged to gradually accelerate fluid from a relatively quiescent area at one end of a housing to a suitably high helical velocity for movement along the length of the housing. Gradual acceleration in development of the helical flow is achieved by a novel fin configuration which in the preferred embodiment presents an increasing surface area in a direction along associated flow lines established by the flow-directing means. The volume of fluid influenced by a fin increases proportionately with the fin area so that as fluid moves downstream it increases uniformly in its velocity for passage through an associated orifice. In addition to uniformly accelerating fluid flow, a fin is oriented in a manner which produces a helical or spiral flow pattern.

BRIEF DESCRIPTION OF THE DRAWING

FIG. 1 is a side view of a cartridge assembly in one embodiment of the principles of the invention, with portions of the cartridge broken away to show its constructional details;

FIG. 2 is a perspective view of a flow-directing element of the invention on a somewhat enlarged scale as employed in the embodiment of FIG. 1;

FIG. 3 is a side view of a cartridge assembly with portions broken away to reveal constructional details thereof in accordance with the second embodiment of the invention;

FIG. 4 is an elevational view, partially in section, of a modified flow-directing element on a somewhat enlarged scale, as used in the embodiment of FIG. 3; and FIG. 5 is an end view of the flow-directing element of FIG. 4.

DESCRIPTION OF THE PREFERRED EMBODIMENTS

Referring now particularly to FIG. 1, there is shown an assembly 10 for filtering and cooling fluid passing therethrough from an inlet 11 to an outlet 12. The assembly 10 includes a canister or cylindrical shell 13 having end closure caps 16 and 17 welded, brazed, soldered or otherwise secured to the ends of the shell in a fluidtight manner. The canister shell or housing 13 and end caps 16 and 17 are preferably formed of steel. Apertured tabs 18 are welded or otherwise fixed to an outer surface 19 of the canister shell 13 to provide a convenient manner for mounting the assembly 10. The illustrated inlet 11 comprises an annular boss 21 stamped from the wall of the associated end cap 16 into which a length of steel tubing 22 is brazed or otherwise connected in fluidtight relation. The illustrated outlet 12 is formed by an internal, centrally disposed boss 23 stamped into the same end cap 16. A flared end of a steel tube 24 is brazed or otherwise fixed in fluidtight relation in the boss 23. An elongated, cylindrical filter element 26 is centrally supported within the shell or housing 13 with its exterior in spaced relation to an interior cylindrical surface 27 of the housing 13 so as to form an annular or circumferential flow passage 28 which extends in an unrestricted manner substantially along the full length of the filter element.

Ideally, the filter 26 is formed as an assembly of dacron polyester felt or other conventional filtering fabric 25 wrapped about a cylindrical supporting medium in the form of a tube 30 fabricated of perforated sheet metal. The filter members 25 and 30 are secured to one another at each end by substantially identical retainer caps 29, preferably formed from sheet metal stock, each with a circumferential groove 31 into which the associated ends of the filter members are received. At one end, adjacent the inlet and outlet ports 11 and 12, a cap or retainer 29 is concentrically supported on the internal boss 23 through an elastomeric bushing or O-ring 32. The end retainer caps 29 are formed with central apertures 33 to permit passage of filtered fluid out of the interior, designated 34, of the filter 26 through the outlet 12. At the opposite end of the filter 26, the cap aperture 33 allows the filter to be concentrically assembled on a circular, generally cup-shaped valve body 37, again with an intermediate elastomeric bushing or O-ring 32.

The valve body 37 is a thin-walled element, ideally stamped from sheet steel or other metal stock, and it includes an outer segmental or spider rim 38 defining an outside diameter approximately equal to the inside diameter of the canister 13, as defined by the interior surface 27. The wall of the valve body 37 is stepped to provide a pair of radial shoulders 39 and 40 and a radial valve seat surface 41. A compressed, coiled spring 44 disposed between the adjacent end cap 17 and the outermost shoulder 39 biases the valve body 37 leftwardly as viewed in FIG. 1, so that the filter assembly 26 and other various elements are maintained in their illustrated relative positions. A relief valve 47 comprising a poppet 48, a compression spring 49, and a stem 51 assembled on the valve body 37 allows fluid to bypass the filter assembly or element 26 in the event it becomes excessively fouled.

Flow-directing means in accordance with the invention is embodied in a peripherally notched washer or baffle 52, preferably stamped or otherwise fashioned of steel or other metal sheet stock. A central aperture 53 is dimensioned to allow the washer 52 to be slipped over the inturned boss 23 while the outside diameter of the washer is dimensioned to fit with limited clearance within the cylindrical surface 27 of the canister 13. In the embodiment of FIGS. 1 and 2, a series of substantially identical notches or orifices 54 are formed in the periphery of the washer 52. Each notch 54 is defined by imaginary straight lines 56 and 57 in the plane of the washer 52 diverging from one another from a point of intersection at a common radius or imaginary circle approximately midway between the inside and outside diameters of the washer. At each notch or orifice 54 a slit is cut along one line 56 to the point of intersection of the other line 57. The material between the lines 56 and 57 is bent forwardly out of the plane of the washer 52 along the outer line 57 until a planar, generally triangular fin 58 is formed at 45 degrees from the plane of the washer body. With respect to a forward axial direction, each fin 58 thus presents an increasing area per unit length, i.e., the width of the fin increases along an axial direction. When assembled in the canister 13, as indicated, each fin 58 extends upstream, with all of the fins having the same orientation with respect to the longitudinal axis of the canister 13 and, in the illustrated example, in the direction of a lefthand screw. An elastomeric sleeve 59 assembled on the inturned boss 23 maintains the flow directing washer 52 within the canister shell 13 in abutting contact with the retainer 29.

The flow-directing washer 52 acting as a wall and the adjacent end cap 16 define an annular chamber 61. The combined area of the plurality of notches 54 is preferably significantly larger than the cross sectional area of the inlet tube 22 or its associated boss 21, for example, being at least twice the area of the latter element. Further, the cross sectional area of the chamber 61 is substantially greater than the combined area of all of the notches 54.

The disclosed cartridge-like assembly 10 is particularly suited for use in an automotive power steering system to both filter and cool hydraulic fluid in order to assure longer service life of the components of the system. Hydraulic oil or other fluid is forced through the assembly 10 by maintaining a higher pressure at the inlet 11 than at the outlet 12. Fluid in the annular chamber 61 is relatively quiescent or motionless, since, as mentioned above, the cross sectional area of this zone is substantially larger than both the inlet 12 and notch orifices 54. Fluid in the chamber 61 migrates toward the orifices 54 because of a slight pressure differential across the chamber between the inlet 12 and orifices 54. As a fluid stream moving generally axially towards a particular aperture or notch 54 passes the associated fin 58, a gradually increasing proportion of its volume is deflected in a lateral direction, with the result that as the stream exits the aperture, it is directed in a swishing helical flow pattern throughout the annular zone or flow passage 28, as indicated by the arrows in FIG. 1. The gradually accelerated, tangential or helical deflection of the flow stream developed by the fins 58 assures that a relatively low pressure drop occurs across each of the apertures 54 and practically no heat is internally generated in the fluid during development of this helical or spiral flow.

The helical swirling flow pattern of fluid in the zone 28 has numerous benefits, an important one of which is an improved cooling rate of the fluid as it passes through the assembly 10. The swirling flow path produces a significant increase in the turbulence of fluid flow over the interior canister surface 27, thereby improving heat transfer to the canister 13 and enabling the canister in turn to discharge an increased amount of heat to its surrounding environment. Other benefits include improved flow distribution over the filter element 26, centrifugal separation of foreign material from the fluid in the annular passage 28, and scrubbing of the filter element by fluid passing over it.

FIGS. 3 through 5 illustrate a second embodiment of a filter assembly 70 incorporating the principles of the invention. The assembly 70 has a general construction and manner of assembly like that of the previously described assembly 10. An inlet and outlet 71 and 72, respectively, are disposed on opposite end caps 73 and 74, assembled on opposite ends of a canister shell 76. Inlet and outlet tubes 77 and 78 are brazed or otherwise sealingly secured to inturned, tubular bosses 81 and 82 stamped in the end caps 73 and 74 and connected to end fittings 83 and 84 of pressure hoses 85 and 86. At the outlet end, a longitudinally pleated paper filter element 87 of known construction is concentrically supported within the canister 76 by an annular retainer 88 assembled on the associated, inturned boss 82, while at its other end the filter element is concentrically supported by a valve body 89. It will be understood that the filter assembly 26 of the embodiment of FIG. 1 may be substituted for the filter element 87, and vice versa.

The valve body 89 is illustrated in FIGS. 4 and 5 on a somewhat enlarged scale. The valve body 89 is a generally cupshaped structure, and includes a re-entrant section forming an annular groove 91 in which the filter element 87 is received. The valve body 89 is formed of steel sheet stock or other rigid, thin-walled material and, like the valve body 37 of the embodiment of FIG. 1, has radial shoulders 92 and 93 and a radial face or seat 94. A compressed coil spring 96 operating against the outer shoulder 92 maintains the valve body 89, filter element 87, and retainer 88 in their respective illustrated positions.

A poppet 97, stem 98 and compressed coil spring 99 form a poppet relief valve 95 equivalent to the valve 47 of FIG. 1. A peripheral flange or baffle 101 integrally formed on the valve body 89 radially outwardly of the groove 91 is notched to provide a circumferential series of spaced apertures 102 and flow-directing fins 103 in a manner equivalent to the apertures and fins 54 and 58 of the washer or insert 52 of the embodiment of FIGS. 1 and 2. The valve body 89 thereby provides support for the filter 87 and bypass valve 95, as well as means for helically or spirally orienting fluid flow over the outer circumference of the filter element 87 in the longitudinally extending, annular zone or flow path, designated 104, between the canister 76 and filter element. As before described in reference to the embodiment of FIG. 1, the apertures 102 are each defined by a pair of imaginary lines 106 and 107 diverging from a point on an imaginary circle common to all of the apertures. The material of the flange 101 is slit on one line 106 and bent forwardly into the planar, generally triangular fins 103. As shown, all of the fins 103 are bent in the same attitude with respect to the longitudinal axis of the canister 76 so that the induced flow exiting the apertures 102 into the zone 104 follows a swirling helical pattern.

While the invention has been described in connection with specific embodiments thereof, it is to be clearly understood that this is done only by way of example, and not as a limitation to the scope of the invention as set forth in the objects thereof and in the appended claims.

What is claimed is:

1. A filter assembly for treating a fluid comprising a circular, thin-walled housing having interior and exterior surfaces, an inlet and an outlet for admitting and discharging fluid to and from the interior of the housing, an elongated filter element extending lengthwise within the housing, the filter element having an outer surface spaced radially inwardly from the interior surface of the housing to provide therebetween an axially extending fluid flow path, means for directing fluid admitted at the inlet towards the flow path, said fluid directing means including a circular chamber at one end of said housing having a major diameter generally equal to the diameter of the housing interior, said fluid-directing means including swirl-inducing means for causing fluid to travel in a helical pattern through said flow path and about the outer surface of the filter, said swirl-inducing means being constructed and arranged to be substantially fully operative on substantially all of said fluid prior to its passage into said flow path, a wall extending between and separating said chamber and said flow path, a plurality of apertures circumferentially spaced on said wall for admitting fluid from said chamber into said flow path, said swirl-inducing means including a flow-deflecting fin associated with each aperture, all of said fins extending from said apertures in a direction away from said flow path, said swirl-inducing means being constructed and arranged to gradually accelerate flow into a helical path whereby internal heating of fluid is thereby substantially avoided.

2. A filter assembly as set forth in claim 1, wherein the cross sectional area of said chamber is substantially larger than the combined area of said apertures.

3. A filter assembly as set forth in claim 1, wherein said fins are integrally formed with said wall by displacement from the area of their respective apertures.

4. A filter assembly as set forth in claim 3, wherein said fins are arranged to present a progressively larger unit surface area in a direction towards said flow path.

5. An assembly for filtering and cooling a fluid, comprising a canister having a thin-walled, cylindrical shell and end closure means, an elongated, generally cylindrical filter element extending lengthwise in the shell, the filter element having an outside diameter less than the inside diameter of the shell and being centrally disposed in the shell such that an annularly extending flow path is defined therebetween, said filter element being hollow along its axial center, a circular wall adjacent one end of the filter element extending radially between the filter element and shell circumferentially about the filter element, said wall being spaced from the adjacent end closure means to form a fluidreceiving chamber therebetween, inlet means on said canister for supplying fluid to said chamber, outlet means on said canister for conductng fluid from the axial hollow of said filter element, said wall having a plurality of circumferentially spaced apertures therethrough adjacent the shell, said apertures having a combined area substantially less than the cross sectional area of said chamber, said wall being arranged with respect to said filter such that substantially all flow through said apertures passes over said filter, and a fin associated with each aperture for inducing a helical flow direction in fluid flowing through the associated aperture, all of said fins extending helically in the same direction from their associated apertures into said chamber, each of said fins having a configuration which gradually increases in unit area from substantially zero at a point distal from its aperture whereby the induction of helical flow is substantially free of turbulence so that internal heating of fluid by said fins is avoided and a net heat loss in said fluid is achieved by its passage through said assembly by means of its forced convection along said shell and its resulting heat transfer therewith.

6. An assembly as set forth in claim 5, wherein said fins are generally triangular, planar bodies having a generally helical attitude with respect to the longitudinal axis of the shell.

7. An assembly as set forth in claim 6, wherein said fins are integral with said wall and are formed by displacing material of said wall from the area of said apertures.

* * * * *